US006371468B1

(12) United States Patent
Lessard et al.

(10) Patent No.: US 6,371,468 B1
(45) Date of Patent: Apr. 16, 2002

(54) UNIVERSAL WORKPIECE HOLDER

(75) Inventors: James A. Lessard, Manchester; Joseph A. Gosselin, Southington, both of CT (US)

(73) Assignee: United Technologies Research Center, East Hartford, CT (US)

( * ) Notice: Subject to any disclaimer, the term of this patent is extended or adjusted under 35 U.S.C. 154(b) by 0 days.

(21) Appl. No.: 09/466,264

(22) Filed: Dec. 17, 1999

(51) Int. Cl.[7] .................................................. B23Q 3/14
(52) U.S. Cl. ......................... 269/48.1; 269/238; 269/49
(58) Field of Search ......................... 269/48.1, 32, 238, 269/49

(56) References Cited

U.S. PATENT DOCUMENTS 3,109,477 A * 11/1963 Avera et al. ............... 269/48.1
3,558,124 A * 1/1971 McMichael .................. 269/49
3,882,647 A 5/1975 Flaischlen
4,177,914 A * 12/1979 Clavin ....................... 269/48.1
4,286,778 A 9/1981 Follmeyer
4,337,932 A * 7/1982 Dennis et al. ............. 269/48.1
4,930,955 A 6/1990 Kawano et al.
5,285,947 A * 2/1994 Depperman ................. 269/269

OTHER PUBLICATIONS

R.M. De Lara, “Modern Machining with Cyl–Chucks”,Pat. No. 2,921,796, Speedgrip Chuck, Inc., 1959, manual—22 pages.
“NCS/JASCO Hydro–Tru Hydraulic Chucks”, Kenneth Crosby, Inc., 1996/1997, Operating manual—35 pages.

* cited by examiner

*Primary Examiner*—Joseph J. Hail, III
*Assistant Examiner*—Lee Wilson

(57) ABSTRACT

The present invention is a universal workpiece holder that includes a unique positioning hub and a plurality of clamping devices for clamping a variety of annularly shaped workpieces having different interior and/or exterior diameters. The positioning hub includes multiple sets of spokes, wherein when a particular set of spokes aligns with the clamping devices, the workpiece holder is able to secure a particularly sized annulus without distorting it. Moreover, upon rotating the positioning hub about its center and aligning a different set of spokes with the clamping devices, the workpiece holder is able to secure a differently sized annulus. Each set of spokes corresponds to a certain sized annulus, thereby eliminating the need for an independent workpiece holder for each differently sized annulus.

56 Claims, 9 Drawing Sheets

UNIVERSAL WORKPIECE HOLDER

TECHNICAL FIELD

This invention relates to a workpiece holder and more particularly, to a workpiece holder capable of securing annularly shaped workpieces of varying diameters.

BACKGROUND ART

A turbomachine, such as an industrial gas turbine for a co-generation system or a gas turbine engine for an aircraft, includes a compressor section, a combustion section, and a turbine section. The compressor section and more particularly, the low pressure compressor section is constructed of a series of circular discs having diameters ranging from about 2.5 ft. (0.75 meters) to 5.0 ft. (1.5 meters). These discs have an annular shape, and therefore, are often referred to as rings. Blades are attached to the exterior circumference of these discs, and as the circular discs rotate, the blades direct the flow of air through the compressor section.

In order to affix the blades to the disc's exterior circumference, precision formed axial slots are machined to within very small tolerances on the disc's exterior circumference, and the blades are inserted within the slots. Thus, the exterior circumference of the disc contains a series of machined slots. These slots are typically formed by a broaching process. Specifically, the broaching machine forms each slot by progressively tearing away (i.e., shearing) away multiple layers of material until the desired shape is achieved. The high force, ranging from about 3000 to 5000 pounds, required to tear away each layer results in creating undesirable stress in and around the slot.

Broaching machines, as well as the fixtures used to secure the discs within the broaching machine, are typically quite large and consume a significant amount of floor space. Because the size of the discs and fixtures are relatively large, the broaching process is susceptible to distorting the discs during set-up or actual machining. Specifically, when the disc is secured within the broaching fixture, the fixture may be over tightened by the operator, thereby causing the edges of the disc to flare. Hence, when the slots are machined-in the edges of such disc, the resulting slot location may not be in the originally specified position. Thus, when multiple discs are attached to each other to form a compressor section, the blades within the consecutively spaced discs may not align with each other.

The broaching process is also very time consuming. Moreover, the procedure for setting-up the broaching machine to manufacture slots in circular discs is complicated, thereby further increasing the overall manufacturing time. Furthermore, a different broaching fixture must be used for each distinctly shaped disc. In other words, if the interior or exterior diameter of the disc varies from another disc, a different fixture must be used. Because a compressor section typically includes a variety of discs having different diameters, numerous broaching fixtures exist and consume significant floor space. Moreover, each broaching fixture is expensive. Therefore, the tooling cost to manufacture a compressor section of a turbomachine is costly. Overall, broaching is a time consuming and expensive method for manufacturing slots within circular discs.

One alternative to broaching is milling, which is a process wherein a mechanical bit rotates and gradually slices or scoops small portions of material until the desired shape is achieved. Compared to the broaching process, milling imparts less residual stress in and around the slot because the bit rotates while moving through the slot. Additionally, the milling tool cuts the workpiece with about 100 to 300 pounds of force, which is only a fraction of the force required in the broaching process. Milling machines are also typically smaller than broaching machines and consume less floor space. Milling is also typically a less time consuming machining process and easier to set-up compared to broaching. Conventional milling fixtures, however, include a restraint, which secures the workpiece in place. This restraint increases the complexity of aligning the bit with the circular disc, which could prevent the milling machine from machining all of the necessary slots within the circular disc in one process. Moreover, in order to mill the slots within one circular disc, two different conventional milling fixtures must be used. One fixture is used during the milling process and the other fixture is used to hold the workpiece during inspection. Therefore, for each differently sized disc, two milling fixtures are required. As mentioned above, a turbomachine's compressor section typically comprises a plurality of discs. Hence, the tooling cost to mill the blade slots within a compressor section is comparable to the tooling cost to broach such slots.

What is needed is a fixture that is capable of securing various sized annularly shaped workpieces within a milling machine.

DISCLOSURE OF INVENTION

The present invention is a universal workpiece holder that includes a unique positioning hub and a plurality of clamping devices for clamping a variety of annular workpieces having different interior and/or exterior diameters. The unique configuration of the positioning hub, which includes multiple sets of spokes extending radially outward from a circular hub, can rotate about its center such that when a certain set of spokes are circumferentially aligned with the clamping devices, the workpiece holder can clamp and secure a corresponding annular workpiece therein. Moreover, the positioning hub can thereafter further rotate about its center such that a different set of spokes are circumferentially aligned with the clamping devices, thereby providing the workpiece holder with the ability to clamp an annulus having a different interior and/or exterior diameter. This versatile workpiece holder eliminates the requirement of having a separate workpiece holder for each distinctly shaped annulus. Rather, individual workpiece holders are replaced with different sets of spokes, whereby each set of spokes has a different length. The spokes cooperate with the clamping devices such that the diameter of the clamping devices is approximately equal to the inside diameter of different annuluses. Once the clamping devices are circumferentially aligned with the appropriate set of spokes, the clamping devices abut the spokes and clamp both the interior and exterior of the annulus at circumferentially aligned opposing points.

The spokes within each set of spokes are equiangularly spaced about the hub. Therefore, when the clamping devices abut the spokes and clamp the annulus, it is clamped with an even distribution of force, thereby reducing the possibility of distorting the annulus. In addition to minimizing the possibility of distortion and reducing the amount of equipment needed to machine different sized annular workpieces and reducing the necessary space associated therewith, the workpiece holder of the present invention is also less complex than those which currently exist. Removing the complexity involved in changing the fixture for each distinctly shaped disc reduces the overall set up time, which, in turn, increases the efficiency of the overall machining process.

Accordingly the present invention relates to a universal workpiece holder for securing a variety of differently sized annular workpieces therein, wherein the annular workpieces have an interior and exterior diameter, the universal workpiece holder including a circular hub having a bore through its center, thereby allowing the circular hub to rotate thereabout, the circular hub including a first plurality of spokes extending radially outward from the circular hub, wherein the first spokes are equiangularly spaced, each of the first spokes having a first predetermined length and a distal end, thereby forming a first hub diameter, and a plurality of clamping devices for circumferential alignment with the first spokes, each of the clamping devices including a sliding block having a locating end, an extensible clamping end, and a length equal to the distance between the locating end and the extensible clamping end, the sliding block positioned outwardly of the circular hub such that the locating end is closer to the circular hub than the clamping end, means for allowing the first block to travel radially of the hub such that when the locating end abuts the distal end of the spoke, the sum of the first hub diameter and twice the length of the sliding block is approximately equal to the interior diameter of the annulus, means for extending the extensible clamping end radially outward of the circular hub for pressing the extensible clamping end against the interior diameter of the annulus, and clamping means for applying a force against the exterior diameter of the annulus at a location circumferentially aligned with the sliding block for clamping the annulus between the clamping end of the sliding block and the clamping means.

In an alternate embodiment of the present invention, the positioning hub further includes additional sets of spokes that are equiangularly spaced from one another but differ in length from the original spokes. The different spoke lengths create a different imaginary diameter and circumference than the original spokes created, thereby accommodating an annularly shaped workpieces having a different diameter. Specifically, the sum of the diameter of the positioning hub, the length of two spokes, and the length of two sliding blocks is about equal to the interior diameter of the annularly shaped workpiece.

The positioning hub, comprising numerous pairs of spokes, can rotate about its center and quickly align with the clamping devices. Once the clamping devices abut the spokes, the clamping devices are ready to receive an annularly shaped workpiece. The positioning hub, therefore, allows one workpiece holder to secure a variety of annular circular shaped discs of different diameters. Thus the present invention is an improvement over the conventional fixtures used for milling because rather than having a different fixture for each disc having a different interior or exterior diameter, the workpiece holder has a positioning hub with different pairs of spokes that correspond to distinctly sized discs. The workpiece holder of the present invention makes milling an attractive alternative for manufacturing slots in annular discs because the workpiece holder is a single fixture that can hold various sized annular discs. A single workpiece holder, therefore, reduces the overall number of fixtures required to manufacture a compressor section, which contains several different sizes of discs. Reducing the overall number of fixtures to manufacture a compressor section, in turn, reduces the tooling cost for such process, which ultimately reduces the overall manufacturing cost.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1:
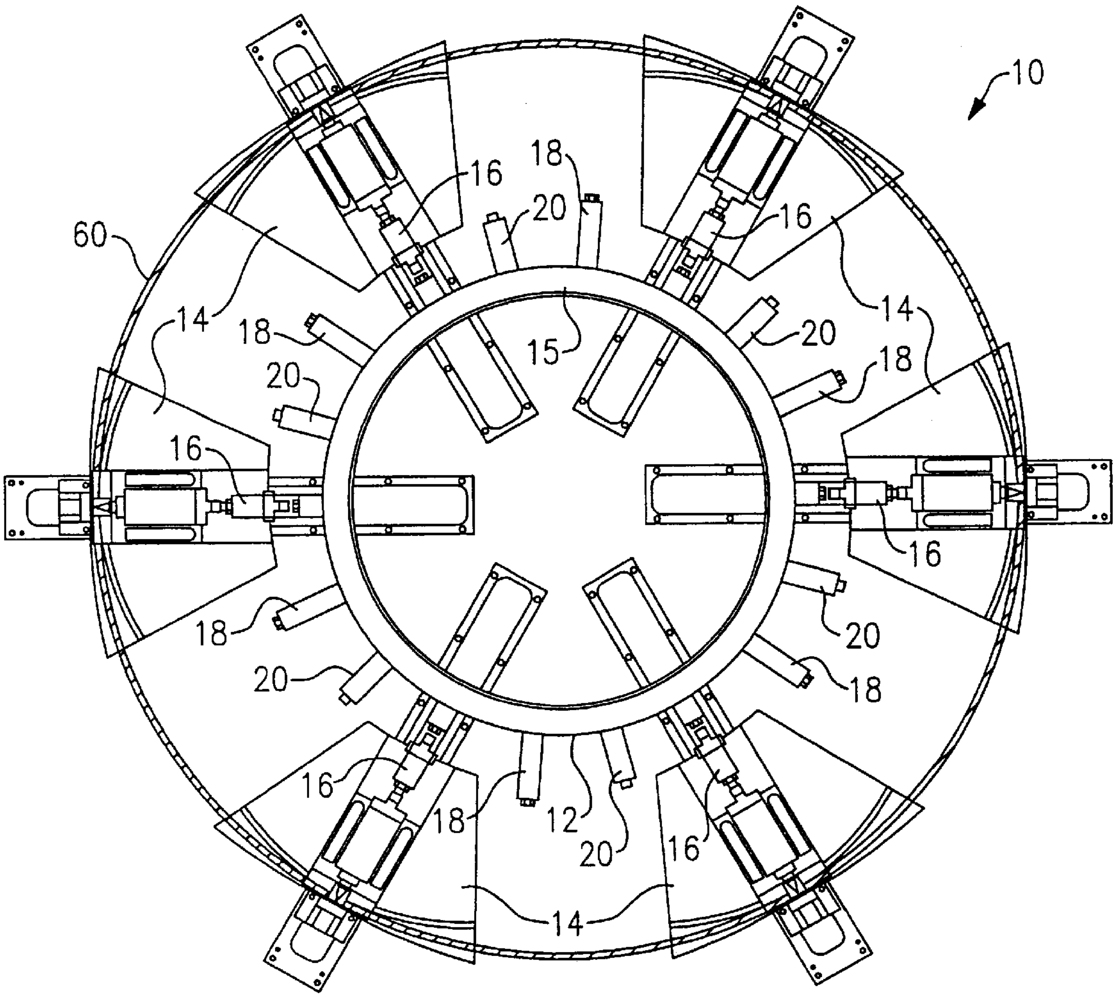
FIG. 1 is a top view of a workpiece holder that includes one embodiment of a positioning hub and a plurality of clamping devices.

Referring to FIG. 1, there is shown a top view of a workpiece holder 10 for securing an annular workpiece 60 therein. The workpiece holder 10 includes a positioning hub 12 and a plurality of clamping devices 14 that clamp the annular workpiece 60 at a plurality of substantially equiangularly spaced locations. The positioning hub 12 includes a circular hub 15 and three sets of spokes numbered 16, 18 and 20 extending radially outward from the circular hub 15. Each set of spokes has a total of six (6) spokes, and the spokes within each set have the same predetermined length and respective distal ends, thereby forming a hub diameter for each set of spokes.

The clamping devices 14, which are equal in number to the number of spokes within the set marked 16, are circumferentially aligned with and abut the spokes 16. Because the spokes 16 are substantially equiangularly spaced, the clamping devices 14 are also substantially equiangularly spaced when aligned with the spokes 16. Specifically, because there are six (6) clamping devices 14, they are spaced at an angle of about 60° from each adjacent clamping device 14. For example, if the clamping devices 14 are spaced exactly 60° from each adjacent clamping device 14, then the clamping devices 14 are exactly equiangularly spaced. However, it may be desirable to space some of the clamping devices 14 at an angle slightly less than or greater than 60°. Specifically, if two (2) of the clamping devices 14 are spaced at an angle of 55° from each other, two (2) other clamping devices 14 will be spaced at an angle of 65° from one another. Therefore, substantially equiangularly spaced shall mean within 5° of being exactly equiangularly spaced. For the purposes herein, equiangularly spaced shall mean either exactly equiangularly spaced or substantially equiangularly spaced. Although this figure illustrates six (6) clamping devices 14, the workpiece holder 10 may contain more or less than six (6) clamping devices 14, and if so, the angle between adjacent clamping devices 14 would accordingly be less or greater than 60°.

The workpiece holder 10 also includes a means for allowing the clamping devices 14 to travel radially of the circular positioning hub 12 (discussed hereinafter). Thus, when the spokes 16 are circumferentially aligned with the clamping devices 14, the clamping devices 14 travel toward the circular positioning hub 12 and abut the spokes 16, thereby allowing the clamping devices 14 to clamp the annularly shaped workpiece 60 therein. However, when the set of spokes marked 18 or 20 are circumferentially aligned with the clamping devices 14, the clamping devices 14 will be able to clamp annuluses having differently sized diameters because the clamping devices 14, which are able to freely travel along a radial direction of the positioning hub 12, will be set at a different hub diameter.

Figure 2:
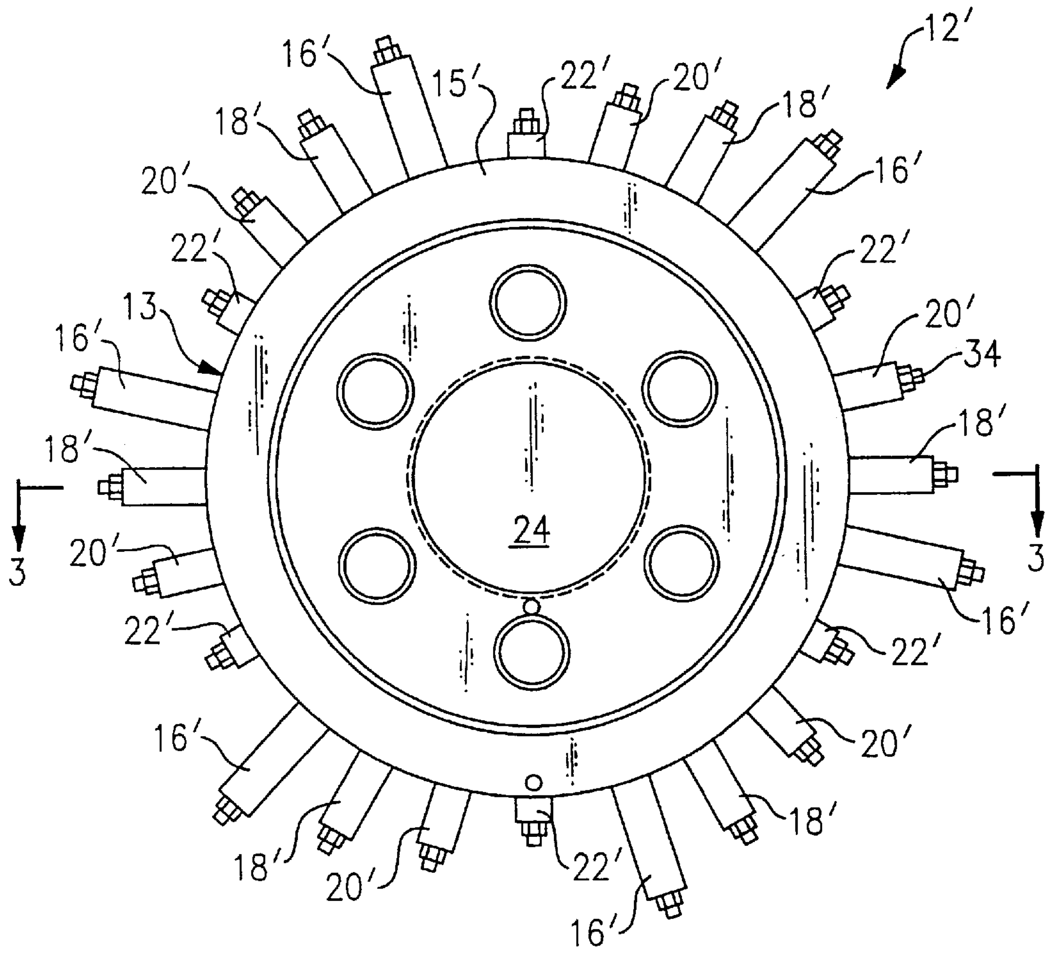
FIG. 2 is a top view of another positioning hub having four sets of spokes numbered 16, 18 and 20.

Referring to FIG. 2, there is shown a top view of an alternate embodiment of the positioning hub 12' having a bore 24 through it center and four sets of spokes numbered 16', 18', 20' and 22', which are affixed to the exterior circumference 13 of the circular hub 15' and extending radially therefrom. The positioning hub 12' is different than the positioning hub 12 in FIG. 1 in that the positioning hub 12 has three sets of spokes, and the positioning hub 12' has four sets of spokes. Continuing to refer to FIG. 2, the positioning hub 12' may contain less or more than four sets of spokes (i.e., 2, 3, 5, 6, etc.) Although the positioning hub 12' has a circular shape, the positioning hub 12' may have a different shape such as rectangular, triangular, etc., which could include additional components that would allow the positioning hub to function in a circular-like manner. As in FIG. 1, each set of spokes contains six spokes. In other words, there are six spokes numbered 16', 18', 20' and 22', respectively. Each spoke within a given set (i.e., having the same number) has an equal length, which is typically different from the length of the spokes within the other sets. Additionally, each set of spokes is equiangularly spaced. Because the spokes within each set have the same length and are equiangularly spaced from one another, each set of spokes forms an imaginary hub diameter, which is greater than the exterior circumference 13 of the circular positioning hub 12'.

Figure 3:
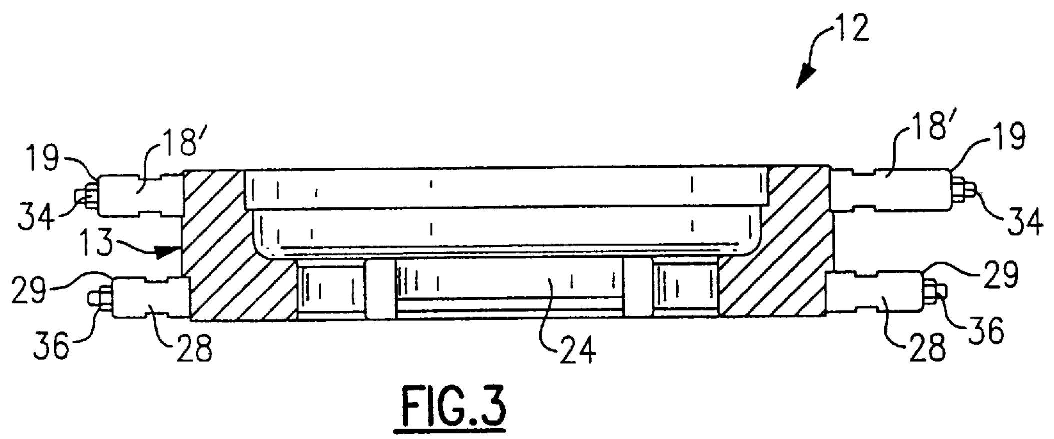
FIG. 3 is a cross-section of the positioning hub illustrated in FIG. 2 taken along line 3—3.

Referring to FIG. 3, there is shown a cross-section of the positioning hub 12' illustrated in FIG. 2 taken along line 3—3. This figure illustrates that for each spoke numbered 16', 18', 20' and 22', there is a corresponding spoke numbered 26', 28', 30', and 32' attached to the exterior circumference 13 of the circular hub 15' and extending radially therefrom. Just as each spoke numbered 16', 18', 20' and 22' has a distal end, so do the spokes numbered 26', 28', 30' and 32'. Each spoke numbered 26', 28', 30', and 32' is also circumferentially aligned with a respective spoke numbered 16', 18', 20' and 22'. The spokes numbered 16', 18', 20' and 22' are, therefore, referred to as the upper spokes, and the spokes numbered 26', 28', 30', and 32' are referred to as the lower spokes. The number of lower spokes is equal to the number of upper spokes. Hence, each corresponding upper and lower spoke form a pair of spokes. For example, the upper spoke numbered 18' corresponds with the lower spoke numbered 28' to form a pair. Because there are a total of six upper spokes numbered 18' and six lower spokes numbered 28', there are a total of six pairs.

Additionally, each corresponding pair of spokes is equiangularly spaced from the other corresponding pairs of spokes. For example, each pair of spokes comprising an upper spoke numbered 18' and a lower spoke numbered 28' is 60° from the next adjacent pair. Although it is not necessary, it is preferable that each spoke contains a work stop 34, 36 in order to prolong the life of the spokes. The work stop 34 is a hardened contact point which is affixed to the distal end 19 of the spoke 18'. If the spoke 18' does not contain a work stop 34, then the hub diameter is equal to the diameter of the circular hub 15' plus twice the length of the spokes 18'. Otherwise, if the spoke 18' includes a work stop 34, than the hub diameter is equal to the diameter of the circular hub 15' plus twice the length of the spokes 18', including the length of the work stop 34.

Each lower spoke within each separate set of spokes numbered 26', 28', 30', and 32' has an equal length, which may be equal to, greater than, or less than the length of spokes within the other sets of lower spokes. In addition, the length of lower spokes within the sets numbered 26', 28', 30', and 32' may be equal to, greater than, or less than the length of the corresponding upper spokes within the sets numbered 16', 18', 20', and 22'. Although each set of upper spokes is illustrated as having different lengths, the upper spokes may have the same lengths while the lengths of the lower spokes may differ. The length of the upper spokes determines the inside clamping diameter of the annular workpiece and the length of the lower spokes determine the exterior clamping diameter. Therefore, the lengths of the upper and lower spokes are adjusted accordingly to accommodate the different interior and exterior diameters of the annular workpieces. The lengths of the upper and lower spokes establish the contact points between the positioning hub 12' and the clamping device 14.

Figure 4:
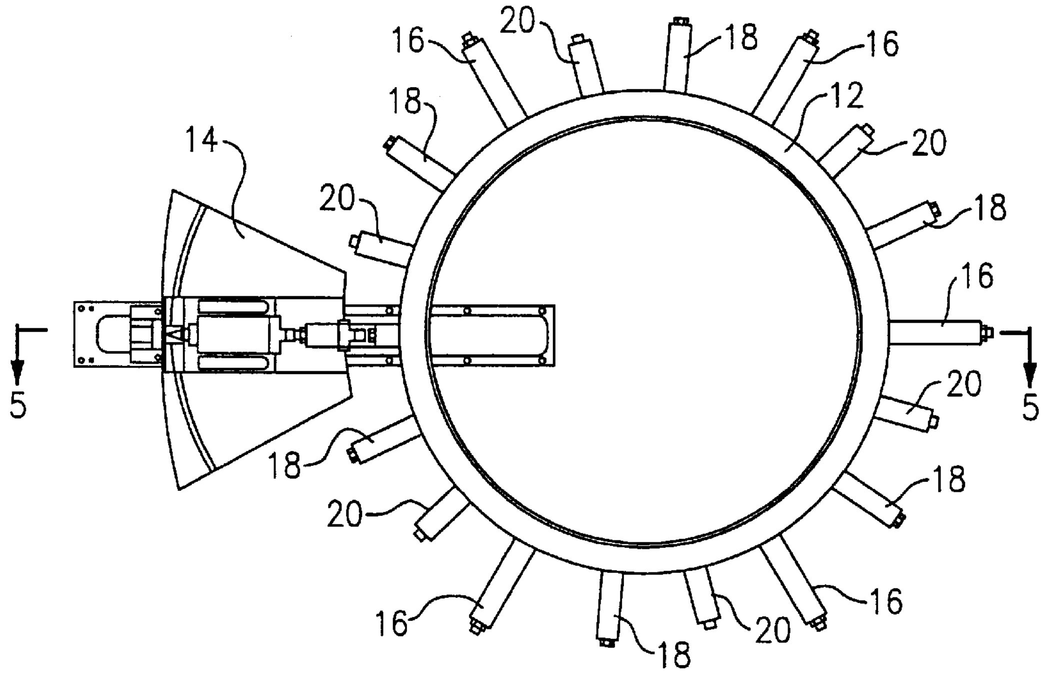
FIG. 4 is a top view of a clamping device abutting the positioning hub.
Figure 5:
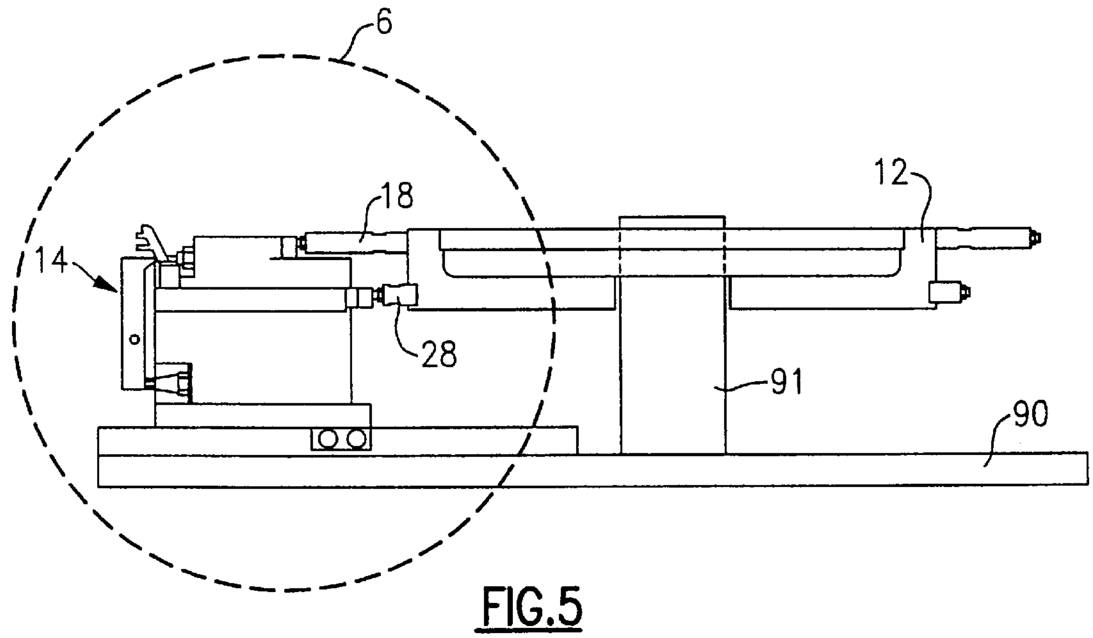
FIG. 5 is a cross-section of the clamping device and the positioning hub illustrated in FIG. 4 taken along line 5—5.

Referring to FIG. 4, there is shown a top view of a clamping device 14 abutting the positioning hub 12 illustrated in FIG. 1. In order to simplify this disclosure, this figure only illustrates one clamping device 14. However, it shall be understood that a clamping device 14 abuts each corresponding pair of upper and lower spokes 18, 28. FIG. 5, which is a cross-section of the clamping device 14 and the positioning hub 12 illustrated in FIG. 4 taken along line 5—5, illustrates the clamping device 14 on a base plate 90 that has a centering pin 91 rigidly affixed thereto. The positioning hub 12 is mounted over the centering pin 91 which rotatably engages the bore 24 of the positioning hub 12, thereby allowing it to rotate thereabout. When the positioning hub 12 rotates to a position such that a pair of spokes align with the clamping devices 14, the clamping device 14 abutting the upper spoke 18 and lower spoke 28 of the positioning hub 12. Moreover, FIG. 6, which is a magnified view of the clamping device 14 and a portion of the positioning hub 12 taken along line 6 of FIG. 5, illustrates the interaction between the clamping device 14 and the positioning hub 12. The clamping device 14, which is located radially outward of the positioning hub 12, includes a first block 38, a second block 48, and a swing arm 68. The first block 38 has a clamping end 44 and a locating end 42, wherein the locating end 42 is closer to the circular positioning hub 12 than the clamping end 44. The first block 38 also includes a means for traveling radially of the positioning hub 12 (discussed hereinafter) along slide 40, thereby allowing the locating end 42 of first block 38 to contact the lower spoke 28. Specifically, because the lower spoke 28 includes a work stop 36, the locating end 42 of first block 38 contacts the work stop 36.

Figure 8:
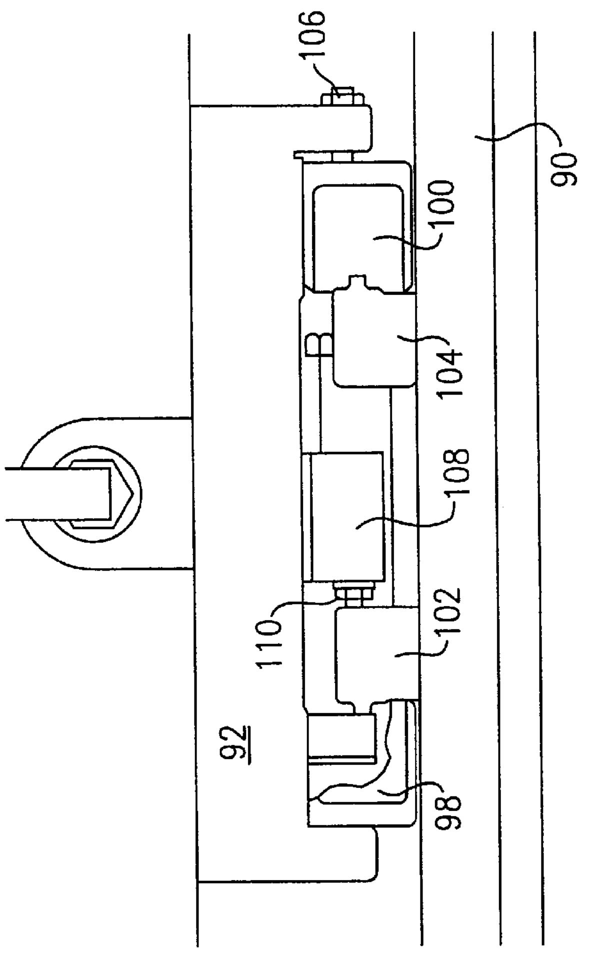
FIG. 8 is a magnified view of the clamping device within broken line 8 of FIG. 7.
Figure 7:
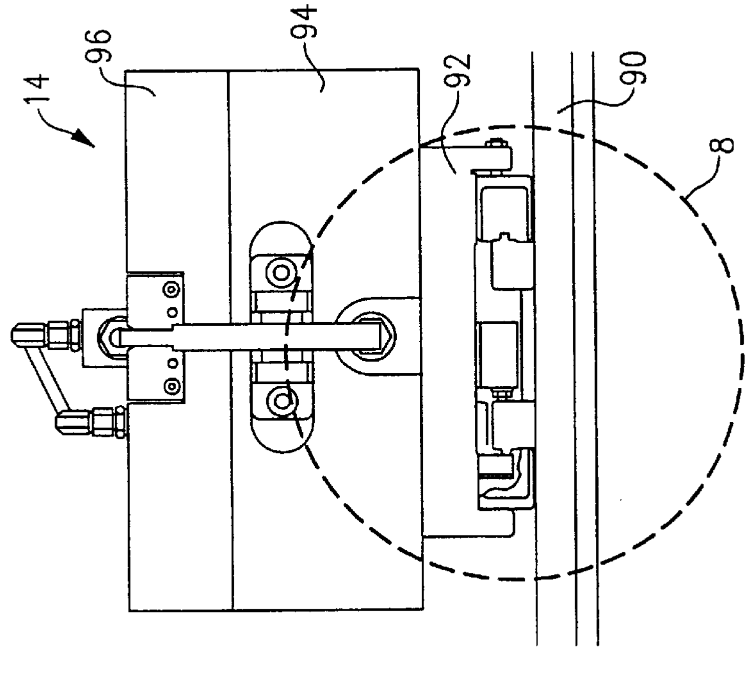
FIG. 7 is an end view of the clamping device from the perspective of its clamping end.

Referring to FIG. 7, the clamping device 14 rests upon a base 90. Specifically, this figure illustrates the clamping device 14 from the perspective of its clamping end 44. Although the first block 38 could be constructed as one piece, it is actually constructed of a bottom part 92, middle part 94, and a top part 96, which are rigidly attached. The bottom and top parts 92, 96 are constructed of steel and the middle part 94 is constructed of aluminum to reduce the overall weight of the first block 38. The bottom part 92 of the first block 38 is attached to a means for allowing the first block 38 to travel radially of the circular positioning hub 12. Referring to FIG. 8, which is a magnified view of such means taken along line 8 in FIG. 7, there is depicted two recirculating ball slides 98, 100 attached to the lower part 92 of the first block 38. The recirculating ball slides 98, 100 engage the corresponding precision ground rails 102, 104, which are rigidly attached to the base 90. The interaction between the recirculating ball slides 98, 100 and the precision ground rails 102, 104 form a precision linear guide. The recirculating ball slides 98, 100 are loosely attached to the lower part 92 in order that a set screw 106 can adjust the position of the recirculating ball slides 98, 100 such that they move closer to or further away from the precision ground rails 102, 104, thereby establishing the desired drag resistance. Once the first block 38 abuts the lower spoke 28, a cylinder 108 is actuated, thereby forcing the plunger (i.e., piston) 110 portion of the cylinder 108 against the precision ground rail 102 and locking the first block 38 in place. Although FIGS. 7 and 8 only illustrate one cylinder 108, it may be preferable to have two cylinders. The actuating fluid can be either hydraulic fluid or air. If the fluid is hydraulic fluid, then the cylinder 108 will be a hydraulic cylinder, and if the fluid is air, the cylinder 108 will be a pneumatic cylinder. It is preferable, however, that the cylinder 108 have the capability to produce about 480 to 580 lbs. of force and more preferably about 390 to 470 lbs.

Figure 9:
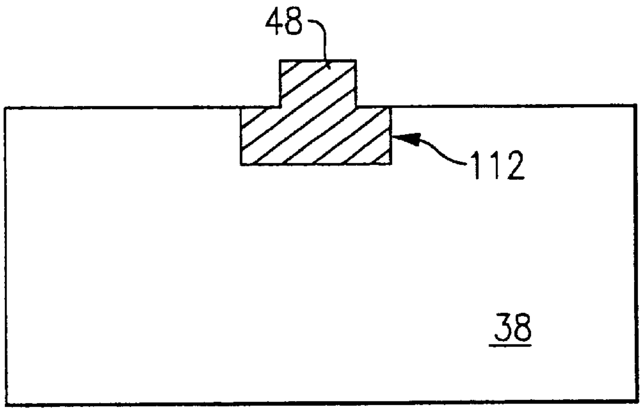
FIG. 9 is an end view of a second block within a groove atop the first block.
Figure 10:
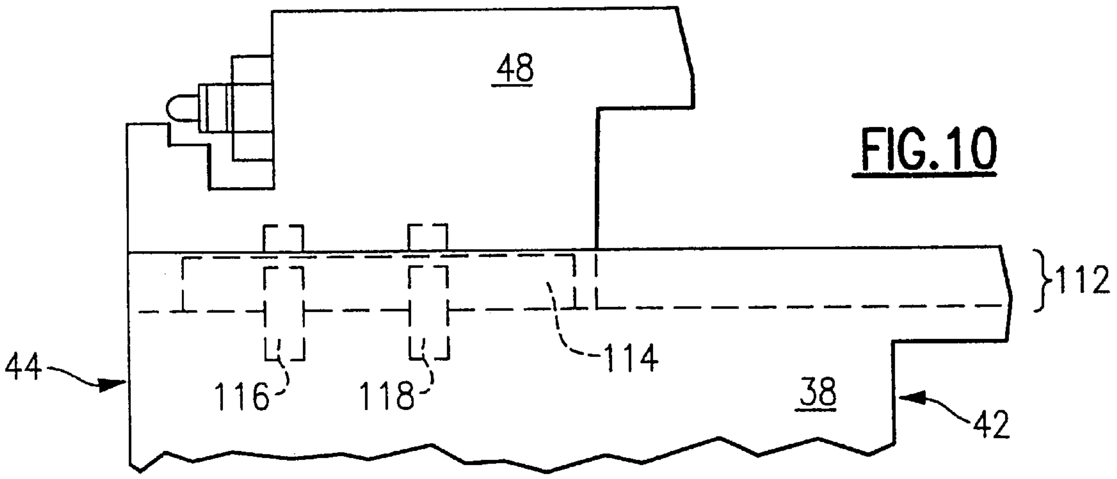
FIG. 10 is a side view of the second block within the groove atop the first block.
Figure 11:
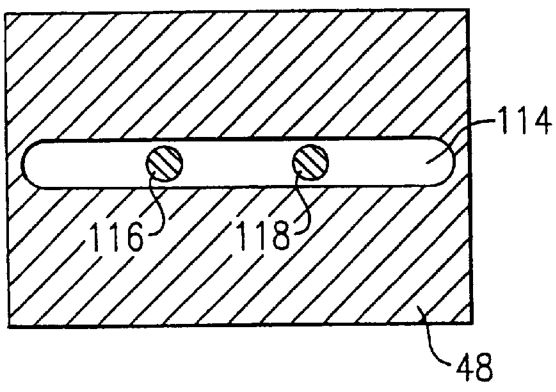
FIG. 11 is a bottom view of the second block.
Figure 12:
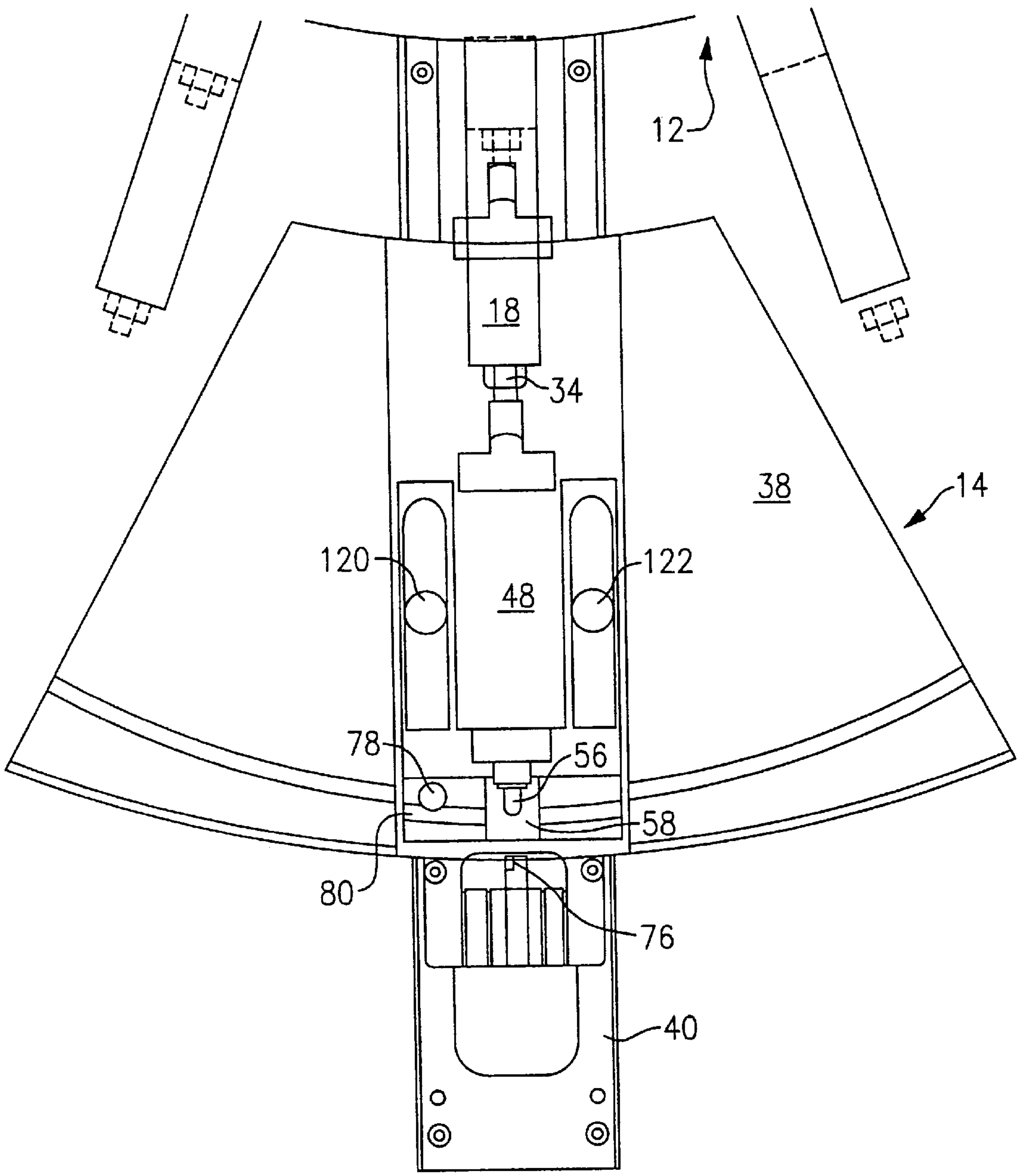
FIG. 12 is a magnified top view of the clamping device abutting the positioning hub.

Referring back to FIG. 6, the second block 48, which sits on the top surface 46 of the first block 38, also has a clamping end 52 and a locating end 50 facing the same direction as the clamping end 44 and the locating end 42 of the first block 38. Because the second block 48 sits atop the first block 38, the second block 48 slides along top surface 46 of the first block 38, thereby allowing the locating end 50 of second block 48 to contact the work stop 34 attached to the upper spoke 18. Referring to FIG. 9, there is shown the second block 48, in the perspective of its clamping end, sitting in a machined groove 112 atop the first block 38. Referring to FIG. 10, the machined groove 112 allows the second block 48 to travel along the top of the first block 38, from its clamping end 44 to its locating end 42. Referring to FIG. 11, there is shown a bottom view of the second block 48. The second block 48 has a slot 114 machined within its bottom surface, and two guide pins 116, 118, which are rigidly attached to the first block 38, protrude into the slot 114 and further guide the movement of the second block 48 within the groove 12. Referring to FIG. 12, there is shown a magnified top view of the clamping device 14 abutting the positioning hub 12. Once the second block 48 abuts the work stop 34 of the upper spoke 18, two set screws 120, 122 are tightened, thereby locking the second block 48 in place.

Referring back to FIG. 6, a plumbing fixture 62 is attached to the second block 48, and the plumbing fixture 62 supplies fluid to the cylinder 54, which is embedded within the second block 48. It is preferable that the cylinder 54 has the capability to produce at least 2 to 5 lbs. of contact force and 100 lbs. of support force. A plunger 56, which is associated with and attached to a cylinder 54, extends the overall length of the second block 48. Specifically, the length of the second block 48 begins at the point it contacts the upper spoke 18 and ends at the tip of the plunger 56. The overall imaginary diameter of the workpiece holder 10 is equal to the sum of the diameter of the positioning hub 12, the length of two upper spokes 18, and the length of two second blocks 48. This imaginary diameter is approximately equal to the inside diameter of the annularly shaped workpiece 60.

Figure 13:
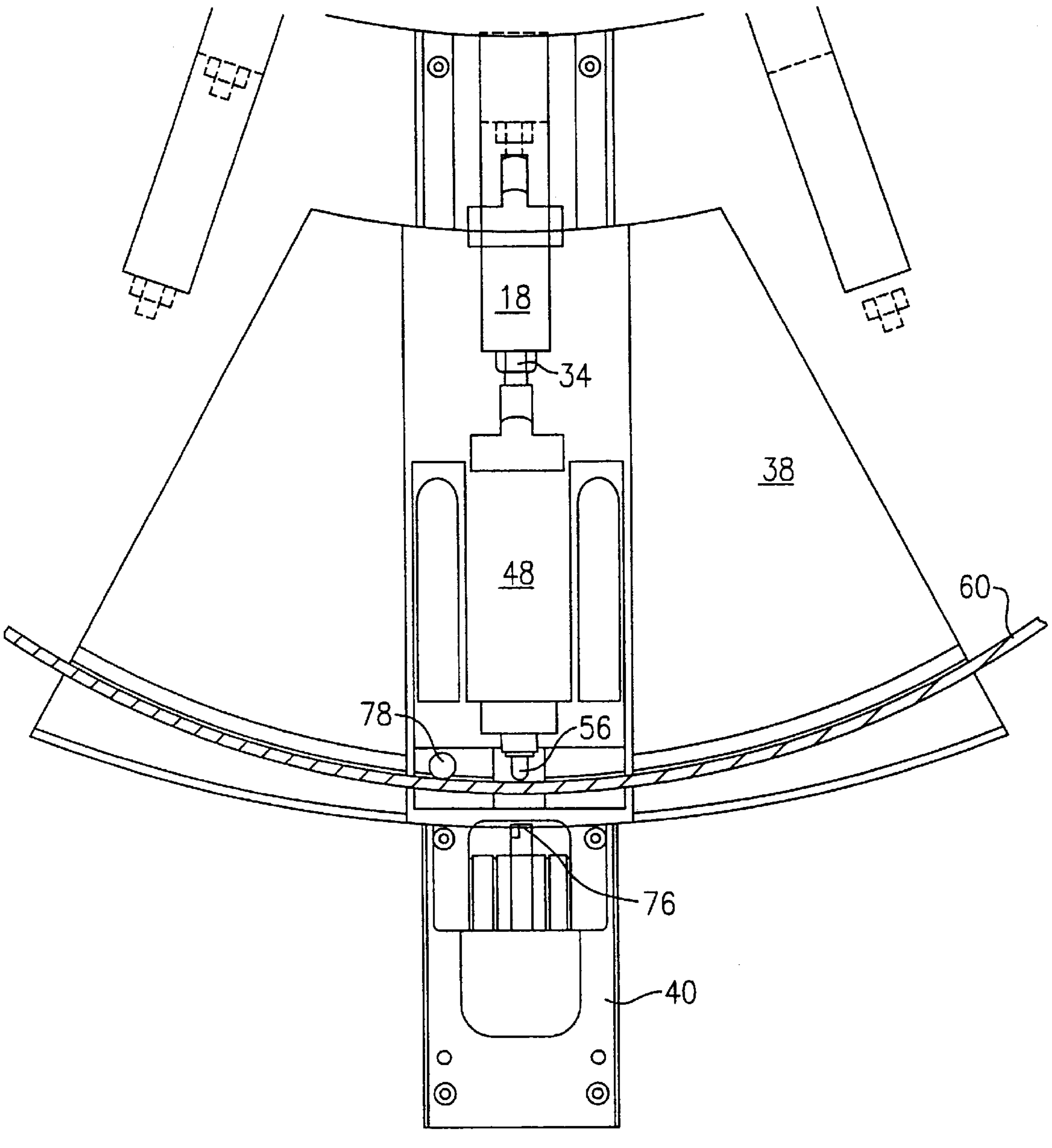
FIG. 13 is a magnified top view of the clamping device abutting the positioning hub, and wherein the clamping device includes an annularly shaped workpiece clamped within the clamping device.

Referring back to FIG. 12, each second block 48 also includes a support surface 58 and a locating pin 78 that is placed at the same position on each second block 48. It may also be preferable that a groove 80 be machined within the clamping device 14 to provide clearance for the annularly shaped workpiece 60 (not shown) to rest upon the support surface 58. Referring to FIG. 13, when the annularly shaped workpiece 60 is initially placed within the workpiece holder 10, the annularly shaped workpiece 60 rests upon the support surface 58. It is also preferable that the annularly shaped workpiece 60 be concentric about the center of the positioning hub 12 when the circular shaped workpiece 60 is initially set on the support surface 58. The locating pins 78 are at the same position on each second block 48 such that when the annularly shaped workpiece 60 sits on the support surface 58, the locating pins 78 are adjacent to the interior diameter of the annularly shaped workpiece 60, thereby making it roughly concentric with the center of positioning hub 12. Depending upon the machining tolerances, there may be a small gap between the locating pin 78 and interior of the annularly shaped workpiece 60. However, it is preferable that the shaped workpiece 60 closely abut the locating pin 78 such that the annularly shaped workpiece 60 is within 0.010 inches of center of the positioning hub 12. Thus, there may be a small gap between the plunger 56 and the circular shaped workpiece 60, wherein the gap is about 0.100 inches. Because all upper spokes 18 have an equal length, all second blocks 48 also have equal lengths, and the locating pin 78 is at the same position on each second block 48, the annularly shaped workpiece 60 is roughly concentric about the center of the positioning hub 12.

Referring back to FIG. 6, after the annularly shaped workpiece 60 is placed upon the support surface 58, the cylinder 54 is pressurized, thereby actuating the plunger 56 to contact the interior diameter of annularly shaped workpiece 60 and removing the gap between the annularly shaped workpiece 60 and the extensible clamping end 44 of the second block 48. Actuating the cylinder 54 allows the plunger 56 for each clamping device 14 to contact the annularly shaped workpiece 60 at a plurality of equiangularly spaced points, thereby retaining the concentricity of the annularly shaped workpiece 60. The plunger 56, which serves as an extensible clamping end 44 of the second block 48, supports the interior of the annularly shaped workpiece 60, such that when it is clamped by the swing arm 68, which contacts the exterior surface of the annularly shaped workpiece 60, the plunger 56 applies a circumferentially and radially aligned counter balancing force to the force imported by the swing arm 68, thereby removing the possibility of distorting the annularly shaped workpiece 60 during clamping.

Figure 6:
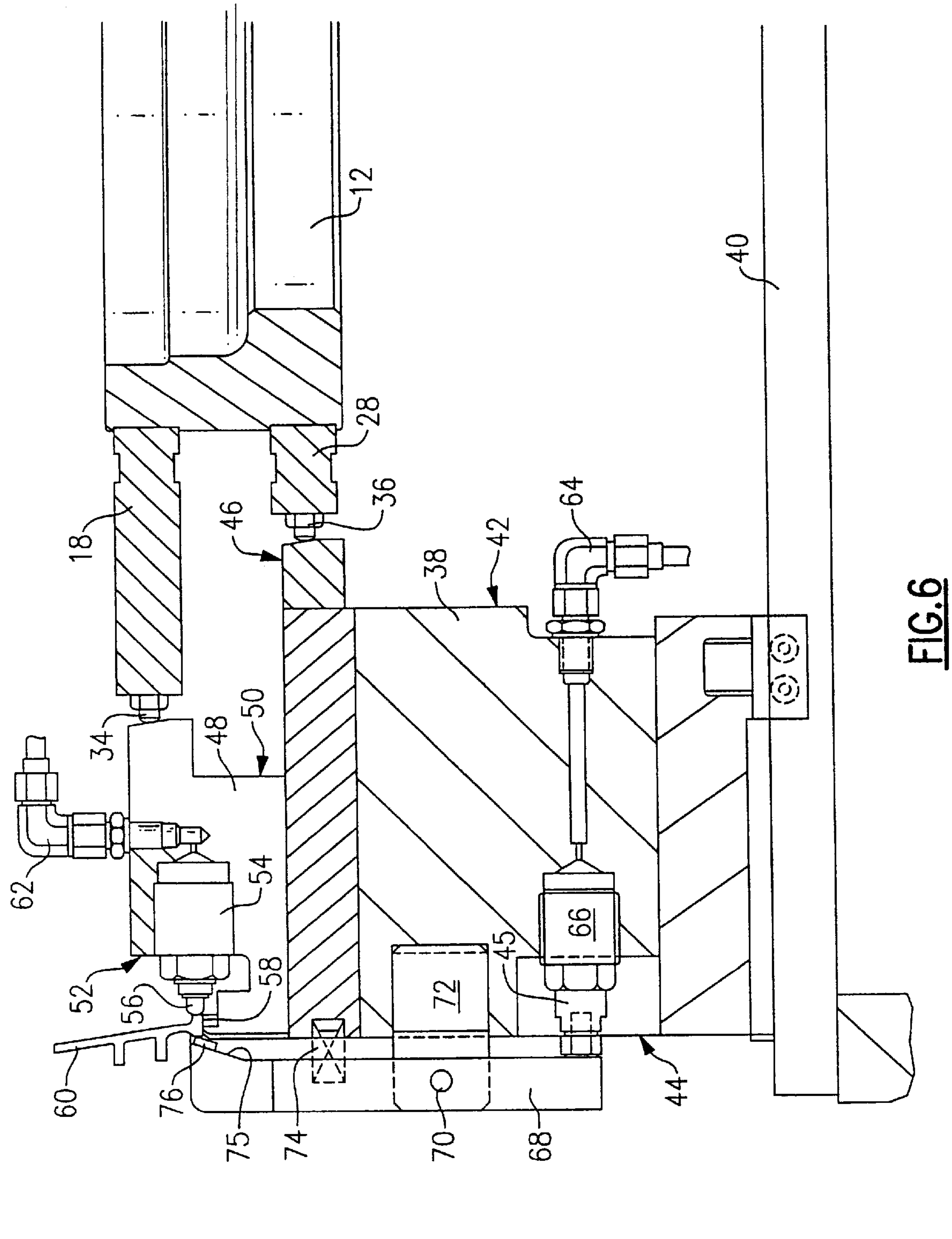
FIG. 6 is a magnified view of the clamping device and a portion of the positioning hub within broken line 6 of FIG. 5.

Continuing to refer to FIG. 6, a bracket 72 is rigidly affixed to the clamping end 44 of the first block 38, and a pivot pin 70 connects the swing arm 68 to the bracket 72, thereby allowing the swing arm 68 to pivot thereabout. A plumbing fixture 64 is affixed to the locating end 42 of the first block 38 and supplies fluid to an actuating cylinder 66, which is embedded within the first block 38 and protrudes through the clamping end 44. It is preferable that the cylinder 66 have the capability to produce about 400 to 500 lbs. of force and more preferably about 450 to 475 lbs. When the actuating cylinder 66 is pressurized, an actuating arm 45 extends and contacts one end of the swing arm 68, thereby forcing the swing arm 68 to pivot about the pivot pin 70 in a clockwise direction such that the clamping end 75 of the swing arm moves 68 toward the clamping end 52 of the second block 48 and contact the exterior diameter of the annularly shaped workpiece 60. Once the clamping end 45 of the swing arm 68 contacts the exterior diameter of the annularly shaped workpiece 60, the clamping end 45 applies a force there against and clamps the annularly shaped workpiece 60 between the clamping end 45 of the swing arm 68 and the plunger 56, which serves as the extensible clamping end 52 of the second block 48. In order to establish a downward force onto the circular shaped workpiece 60, it is preferable that the swing arm 68 rotate in a clockwise direction to a position about 1° to 10° past a vertical plane passing through the axis of the pivot pin 70. It is even more preferable that the swing arm 68 rotate about 1° to 5° past the vertical axis and especially preferable to rotate about 1° to 2°.

Figure 14:
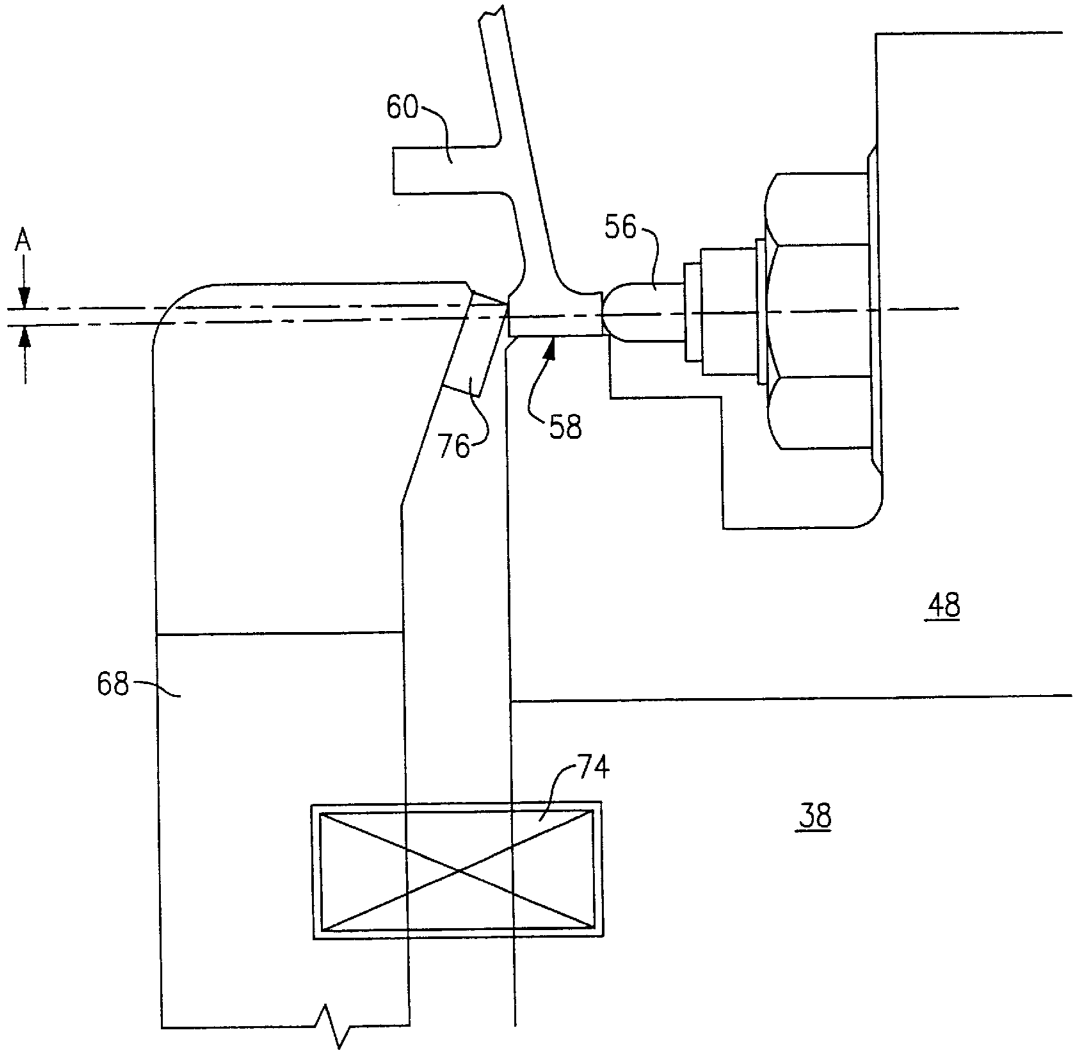
FIG. 14 illustrates an annularly shaped workpiece being clamped between a clamping end of a swing arm and a second block that includes a cylinder embedded therein creating an extensible clamping end.

It is preferable for the clamping end 75 of the swing arm 68 to include a replaceable tip 76 in order to prolong the life of the swing arm 68. Referring to FIG. 14, it is also preferable that the extension of the cylinder 66 and the swing arm 68 be designed such that when the cylinder 66 is actuated, the tip 76 is slightly higher than the horizontal axis of the plunger 56. Specifically, distance A is the distance between the horizontal axis of the plunger 56 and the point at which the replaceable tip 76 contacts the circular shaped workpiece 60. It is preferable that A is equal to about 0.001 inches to 0.100 inches, more preferable that A is equal to about 0.005 inches to 0.050 inches, and especially preferable that A equal about 0.010 inches to 0.020 inches. Creating this offset, along with rotating the swing arm 68 past the vertical axis of its pivot point, assures that the swing arm 68 will establish a downward force on the annularly shaped workpiece 60, thereby securing it in place and preventing it from lifting out of the clamping device during machining. However, the offset is a slight offset such that the forces applied by the clamping end 75 of the swing arm 68 and the plunger 56 are radially aligned as possible to minimize the likelihood of distorting the annularly shaped workpiece 60.

It is also preferable that the extension of the cylinder 66 and the swing arm 68 be designed such that when the cylinder 66 is actuated, the tip 76 is vertically aligned with the clamping end 44 of the first block 38. Therefore, the distance between the clamping end 44 of the first block 38 and the plunger 56 of the second block 48 is about equal to the radial thickness of the annularly shaped workpiece 60. In other words, the sum of the hub diameter, the length of two upper spokes 18, and the length of two second blocks 48 about equals the interior diameter of the annularly shaped workpiece 60. Also, the sum of the hub diameter, the length of two lower spokes 28, and the length of two first blocks 38 about equals the exterior diameter of the annularly shaped workpiece. Therefore, the radial thickness of the annularly shaped workpiece 60 is equal to the difference between its interior diameter and exterior diameter.

After releasing the pressure within the cylinder 66 and the cylinder 54, a return spring, such as compression spring 74 located above the rotational axis of the swing arm 68, assists in moving the tip 76 of the swing arm 68 away from the annularly shaped workpiece 60, thereby allowing it be removed from the workpiece holder 10. If a different sized annularly shaped workpiece requires machining, the workpiece holder 10 can quickly be adjusted to accommodate the new annularly shaped workpiece. Specifically, the first block 38 would be unlocked from the rail 40 and move away from the positioning hub 12. The second block 48 would also be unlocked from the first block 38. Thereafter, the positioning hub 12 would rotate about the centering pin, which is connected to the base of the workpiece holder 10 and protrudes through the bore 24 of positioning hub 12. Once the corresponding pairs of spokes are aligned with the clamping devices 14, the first block 38 would travel along the rail 40 until the first block 38 contacts the lower spoke. Thereafter, the first block 38 is locked in place, and the second block 48 travels along the top surface 46 of the first block 38 until the second block 48 contacts the upper spoke. Once the second block 48 contacts the upper spoke, the second block 48 is locked in place. The new annularly shaped workpiece is then lowered onto the support surface 58, adjacent the locating pin 78, and the cylinders 54, 66 are actuated, thereby securing the new annularly shaped workpiece in place.

For example, if the appropriate pairs of spokes for the new annularly shaped workpiece are such that the upper spoke is numbered 20 and the corresponding lower spoke is numbered 30, then the interior diameter of the new annularly shaped workpiece is about equal to the diameter of the positioning hub 12 and lengths of two upper spokes 20 and two second blocks 48. The exterior diameter of the new annularly shaped workpiece is about equal to the diameter of the positioning hub 12 and lengths of two lower spokes 20 and two first blocks 48, and the radial thickness of the new annularly shaped workpiece is about equal to the difference between its interior diameter and exterior diameter. Assuming that the lengths of the first and second blocks remain constant, the hub diameter is altered by changing the lengths of the upper and lower spokes, thereby accommodating multiple annularly shaped workpieces having different interior and exterior diameters. The positioning hub of the present invention has a plurality of upper and lower spokes having a variety of sizes. Therefore, the workpiece holder of the present invention can secure numerous annularly shaped workpieces having various diameters and thicknesses. Specifically, by rotating the positioning hub such that the appropriate pairs of spokes align with the clamping devices, the workpiece holder can quickly clamp the annularly shaped workpiece in place.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A workpiece holder for securing an annulus therein, wherein the annulus has an interior and exterior diameter, the workpiece holder comprising:

(a) a circular hub comprising a plurality of spokes extending radially outward therefrom, wherein said spokes are equiangularly spaced, each of said spokes having a predetermined length and a distal end, thereby forming a hub diameter; and (b) a plurality of clamping devices circumferentially aligned with said spokes, each of said clamping devices comprising:

(1) a first sliding block having a locating end, an extensible clamping end, and a length equal to the distance between said locating end and said extensible clamping end, said sliding block positioned outwardly of said circular hub such that said locating end is closer to said circular hub than said clamping end;

(2) means for allowing said first block to travel radially of said circular hub such that when said locating end abuts said distal end of said spoke, the sum of said hub diameter and twice said length of said sliding block is approximately equal to the interior diameter of the annulus;

(3) means for extending said extensible clamping end radially outward of said circular hub for pressing said extensible clamping end against the interior diameter of the annulus; and (4) clamping means for applying a force against the exterior diameter of the annulus at a location circumferentially aligned with said sliding block for clamping the annulus between said extensible clamping end of said sliding block and said clamping means.

2. A universal workpiece holder for securing a variety of differently sized annular workpieces therein, wherein the annular workpieces have an interior and exterior diameter, said universal workpiece holder comprising:

(a) a base plate;

(b) a centering pin rigidly attached to said base plate;

(c) a circular hub having a bore through its center, said centering pin located within said bore, thereby allowing said circular hub to rotate thereabout, said circular hub comprising a first plurality of spokes extending radially outward from said circular hub, wherein said first spokes are equiangularly spaced, each of said first spokes having a first predetermined length and a distal end, thereby forming a first hub diameter; and (d) a plurality of clamping devices circumferentially aligned with said first spokes, each of said clamping devices comprising:

(1) a first sliding block having a locating end, an extensible clamping end, and a length equal to the distance between said locating end and said extensible clamping end, said sliding block positioned outwardly of said circular hub such that said locating end is closer to said circular hub than said clamping end;

(2) means for allowing said first block to travel radially of said circular hub such that when said locating end abuts said distal end of said spoke, the sum of said hub diameter and twice said length of said sliding block is approximately equal to the interior diameter of the annular workpiece;

(3) means for extending said extensible clamping end radially outward of said circular hub for pressing said extensible clamping end against the interior diameter of the annular workpiece; and (4) clamping means for applying a force against the exterior diameter of the annular workpiece at a location circumferentially aligned with said sliding block for clamping the annular workpiece between said extensible clamping end of said sliding block and said clamping means.

3. The workpiece holder of claim 2 wherein said circular hub further comprises a second plurality of spokes extending radially outward therefrom, wherein said second spokes are equiangularly spaced, wherein said second spokes are not circumferentially aligned with said first spokes, each of said second spokes having a second predetermined length and a distal end thereby forming second hub diameter, wherein said second predetermined length is different from said first predetermined length.

4. The workpiece holder of claim 3 further comprising a means for circumferentially aligning said clamping devices with said second spokes and wherein each of said clamping devices further comprises means for allowing said first block to travel radially of the hub such that when said locating end abuts said distal end of said second spoke, the sum of said second hub diameter and twice said length of said sliding block is approximately equal to the interior diameter of a second annular workpiece.

5. The workpiece holder of claim 3 wherein said circular hub further comprises a third plurality of spokes extending radially outward therefrom, wherein said third spokes are equiangularly spaced, wherein said third spokes are not circumferentially aligned with said first or second spokes, each of said third spokes having a third predetermined length and a distal end thereby forming third hub diameter, wherein said third predetermined length is different from said first and second predetermined lengths.

6. The workpiece holder of claim 5 further comprising a means for circumferentially aligning said clamping devices with said third spokes and wherein each of said clamping devices further comprises means for allowing said first block to travel radially of the hub such that when said locating end abuts said distal end of said third spoke, the sum of said third hub diameter and twice said length of said sliding block is approximately equal to the interior diameter of a third annular workpiece.

7. The workpiece holder of claim 5 wherein said circular hub further comprises a fourth plurality of spokes extending radially outward therefrom, wherein said fourth spokes are equiangularly spaced, wherein said fourth spokes are not circumferentially aligned with said first, second, or third spokes, each of said fourth spokes having a fourth predetermined length and a distal end thereby forming fourth hub diameter, wherein said fourth predetermined length is different from said first, second, or third predetermined lengths.

8. The workpiece holder of claim 7 further comprising a means for circumferentially aligning said clamping devices with said fourth spokes and wherein each of said clamping devices further comprises means for allowing said first block to travel radially of the hub such that when said locating end abuts said distal end of said fourth spoke, the sum of said fourth hub diameter and twice said length of said sliding block is approximately equal to the interior diameter of a fourth annular workpiece.

9. The workpiece holder of claim 7 wherein said circular hub further comprises a fifth plurality of spokes extending radially outward therefrom, wherein said fifth spokes are equiangularly spaced, wherein said fifth spokes are not circumferentially aligned with said first, second, third, or third spokes, each of said fifth spokes having a fifth predetermined length and a distal end thereby forming fifth hub diameter, wherein said fifth predetermined length is different from said first, second, third, or fourth predetermined lengths.

10. The workpiece holder of claim 9 further comprising a means for circumferentially aligning said clamping devices with said fifth spokes and wherein each of said clamping devices further comprises means for allowing said first block to travel radially of the hub such that when said locating end abuts said distal end of said fifth spoke, the sum of said fifth hub diameter and twice said length of said sliding block is approximately equal to the interior diameter of a fifth annular workpiece.

11. A workpiece holder for securing a variety of differently sized annular workpieces therein, said workpiece holder comprising:

(a) a base plate;

(b) a centering pin rigidly attached to said base plate;

(c) a circular hub having a bore through its center, said centering pin located within said bore, thereby allowing said circular hub to rotate thereabout, said circular hub comprising a plurality of pairs of spokes extending radially outward from said circular hub, wherein said pairs are equiangularly spaced, each of said pairs comprising:

(1) a first spoke having a predetermined length and a distal end; and (2) a second spoke having a predetermined length and a distal end, said second spoke circumferentially aligned with said first spoke; and (d) a plurality of clamping devices circumferentially aligned with said pairs of spokes, each of said clamping devices comprising:

(1) a first sliding block having a locating end and a clamping end, said sliding block positioned outwardly of said circular hub such that said locating end is adjacent to said distal end of said first spoke;

(2) means for allowing said first sliding block to travel radially of the hub;

(3) a second sliding block having a locating end and a clamping end, said second block's locating and clamping ends positioned in the same direction of said first block's locating and clamping ends, said second sliding block positioned atop said first sliding block such that said locating end is adjacent to said distal end of said second spoke;

(4) means for allowing said second sliding block to travel radially of the hub atop said first sliding block;

(5) a swing arm rigidly attached to said first block and pivoting thereabout, said swing arm having an actuating end and a clamping end; and (6) means for actuating said swing arm such that upon said actuation, said clamping end of said swing arm pivots toward said clamping end of said second block.

12. The workpiece holder of claim 11 wherein the number of pairs of spokes equals the number of clamping devices.

13. The workpiece holder of claim 11 wherein said first spoke comprises a replaceable work stop protruding from said distal end.

14. The workpiece holder of claim 11 wherein said second spoke comprises a replaceable work stop protruding from said distal end.

15. The workpiece holder of claim 11 wherein said predetermined length of said second spoke is less than said predetermined length of said first spoke.

16. The workpiece holder of claim 11 wherein said predetermined length of said second spoke is equal to said predetermined length of said first spoke.

17. The workpiece holder of claim 11 wherein said predetermined length of said second spoke is greater than said predetermined length of said first spoke.

18. The workpiece holder of claim 11 wherein said circular hub further comprises a second plurality of pairs of spokes extending radially therefrom, wherein said second pairs are equiangularly spaced, each of said second pairs comprising:

(a) a first spoke having a predetermined length; and (b) a second spoke having a predetermined length, wherein said second spoke is circumferentially aligned with said first spoke.

19. The workpiece holder of claim 18 wherein said circular hub further comprises a third plurality of pairs of spokes extending radially therefrom, wherein each of said third pairs is equiangular from one another, each of said third pairs comprising:

(a) a first spoke having a predetermined length; and (b) a second spoke having a predetermined length, wherein said second spoke is circumferentially aligned with said first spoke.

20. The workpiece holder of claim 19 wherein said circular hub further comprises a fourth plurality of pairs of spokes, wherein said fourth pairs are equiangularly spaced, each of said fourth pairs comprising:

(a) a first spoke having a predetermined length and; and (b) a second spoke having a predetermined length, wherein said second spoke is circumferentially aligned with said first spoke.

21. The workpiece holder of claim 20 wherein said circular hub further comprises a fifth plurality of pairs of spokes, wherein each of said fifth pairs are equiangularly spaced, each of said fifth pairs comprising:

(a) a first spoke having a predetermined length and; and (b) a second spoke having a predetermined length, wherein said second spoke is circumferentially aligned with said first spoke.

22. The workpiece holder of claim 11 wherein said means for actuating said swing arm comprises a cylinder and an actuating arm extending from said first block and contacting said actuating end of said swing arm.

23. The workpiece holder of claim 11 wherein said second block further comprises a cylinder embedded therein and a plunger attached to said cylinder.

24. The workpiece holder of claim 23 wherein said second block further comprises a locating pin attached atop said second block.

25. The workpiece holder of claim 24 wherein before said cylinder is actuated, the distance between said locating pin and said swing arm is less than the distance between said plunger and said swing arm, and wherein after said cylinder is actuated, the distance between said locating pin and said swing arm is greater than the distance between said plunger and said swing arm.

26. The workpiece holder of claim 11 wherein said clamping end of said swing arm is offset from the horizontal axis of said plunger.

27. The workpiece holder of claim 11 further comprising a means for securing said first block to said means for allowing said first block to travel along said radial direction.

28. The workpiece holder of claim 11 further comprising a means for securing said second block to said means for allowing said second block to travel along said radial direction.

29. The workpiece holder of claim 11 further comprising a compression spring between said swing arm and said first block.

30. The workpiece holder of claim 11 wherein said swing arm further comprises a replaceable tip located at said clamping end.

31. A positioning hub comprising: a circular hub having a plurality of pairs of spokes extending radially outward therefrom, wherein said pairs are equiangularly spaced, each of said pairs comprising:

(a) a first spoke having a predetermined length and a distal end, (b) a second spoke having a predetermined length and a distal end, wherein said second spoke is circumferentially aligned with said first spoke, and (c) a clamping device radially aligned in registration against said spokes having means for engaging the interior diameter and the exterior diameter of an annulus that is axially aligned with said hub and applying a clamping force to said annulus.

32. The positioning hub of claim 31 wherein said first spoke comprises a replaceable work stop protruding from said distal end.

33. The positioning hub of claim 31 wherein said second spoke comprises a replaceable work stop protruding from said distal end.

34. The positioning hub of claim 31 further comprising a bore through its center.

35. The positioning hub of claim 31 wherein said predetermined length of said second spoke is less than said predetermined length of said first spoke.

36. The positioning hub of claim 31 wherein said predetermined length of said second spoke is equal to said predetermined length of said first spoke.

37. The positioning hub of claim 31 wherein said predetermined length of said second spoke is greater than said predetermined length of said first spoke.

38. The positioning hub of claim 31 wherein said circular hub further comprises a second plurality of pairs of spokes extending radially therefrom, wherein said second pairs are equiangularly spaced, each of said second pairs comprising:

(a) a first spoke having a predetermined length; and (b) a second spoke having a predetermined length, wherein said second spoke is circumferentially aligned with said first spoke.

39. The positioning hub of claim 38 wherein said second pairs of spokes are not circumferentially aligned with said pairs of spokes.

40. The positioning hub of claim 38 wherein said circular hub further comprises a third plurality of pairs of spokes extending radially therefrom, wherein each of said third pairs is equiangular from one another, each of said third pairs comprising:

(1) a first spoke having a predetermined length; and (2) a second spoke having a predetermined length, wherein said second spoke is circumferentially aligned with said first spoke.

41. The positioning hub of claim 40 wherein said third pairs of spokes are not circumferentially aligned with said second pairs of spokes or said pairs of spokes.

42. The positioning hub of claim 40 wherein said circular hub further comprises a fourth plurality of pairs of spokes, wherein said fourth pairs are equiangularly spaced, each of said fourth pairs comprising:

(a) a first spoke having a predetermined length and; and (b) a second spoke having a predetermined length, wherein said second spoke is circumferentially aligned with said first spoke.

43. The positioning hub of claim 42 wherein said fourth pairs of spokes are not circumferentially aligned with said third pairs of spokes or said second pairs of spokes or said pairs of spokes.

44. The positioning hub of claim 42 wherein said circular hub further comprises a fifth plurality of pairs of spokes, wherein each of said fifth pairs are equiangularly spaced, each of said fifth pairs comprising:

(a) a first spoke having a predetermined length and; and (b) a second spoke having a predetermined length, wherein said second spoke is circumferentially aligned with said first spoke.

45. The positioning hub of claim 42 wherein said fifth pairs of spokes are not circumferentially aligned with said fourth pairs of spokes or said third pairs of spokes or said second pairs of spokes or said pairs of spokes.

46. An adjustable clamping device, comprising:

(a) a first block having a locating end and a clamping end;

(b) means for allowing said first block to travel along a radial direction;

(c) a second block having a locating end and a clamping end which face the same respective directions as said first block's locating and clamping ends, said second block located atop said first block;

(d) means for allowing said second block to travel along said radial direction;

(e) a swing arm rigidly attached to said first block and pivoting thereabout, said swing arm having an actuating end and a clamping end; and (f) means for actuating said swing arm such that, upon actuation, said clamping end of said swing arm end pivots toward said clamping end of said second block.

47. The adjustable clamping device of claim 46 wherein said means for actuating said swing arm comprises a cylinder and actuating arm extending from said first block and contacting said actuating end of said swing arm.

48. The adjustable clamping device of claim 47 wherein said second block further comprises a cylinder embedded therein and wherein said cylinder has a plunger associated therewith.

49. The adjustable clamping device of claim 48 wherein said second block further comprises a locating pin attached atop said second block.

50. The adjustable clamping device of claim 49 wherein before said cylinder is actuated, the distance between said locating pin and said swing arm is less than the distance between said plunger and said swing arm, and wherein after said cylinder is actuated, the distance between said locating pin and said swing arm is greater than the distance between said plunger said swing arm.

51. The adjustable clamping device of claim 50 wherein said means for actuating said swing arm comprises an other cylinder extending from said first block and contacting said actuating end of said swing arm, wherein after said other cylinder is actuated, said clamping end of said swing arm is higher than the horizontal axis of said plunger.

52. The adjustable clamping device of claim 51 wherein said clamping end of said swing arm is slightly higher than the horizontal axis of said plunger.

53. The adjustable clamping device of claims 46 further comprising a means for securing said first block to said means for allowing said first block to travel along said axial direction.

54. The adjustable clamping device of claim 46 further comprising a means for securing said second block to said means for allowing said second block to travel along said axial direction.

55. The adjustable clamping device of claim 46 further comprising a return spring.

56. The adjustable clamping device of claim 46 wherein said swing arm further comprises a replaceable tip located at said contacting end.

* * * * *

UNITED STATES PATENT AND TRADEMARK OFFICE

CERTIFICATE OF CORRECTION

PATENT NO. : 6,371,468 B1
DATED : April 16, 2002
INVENTOR(S) : James E. Lessard and Joseph A. Gosselin It is certified that error appears in the above-identified patent and that said Letters Patent is hereby corrected as shown below:

Title page,
Item [75], Assignee: should read -- United Technologies Corporation, East Hartford, CT --

Signed and Sealed this

Twenty-sixth Day of November, 2002

Attest:

JAMES E. ROGAN

*Attesting Officer*

*Director of the United States Patent and Trademark Office*